A. MESSER.
WELDING AND SOLDERING TORCH.
APPLICATION FILED JUNE 29, 1911.
1,214,055.
Patented Jan. 30, 1917.
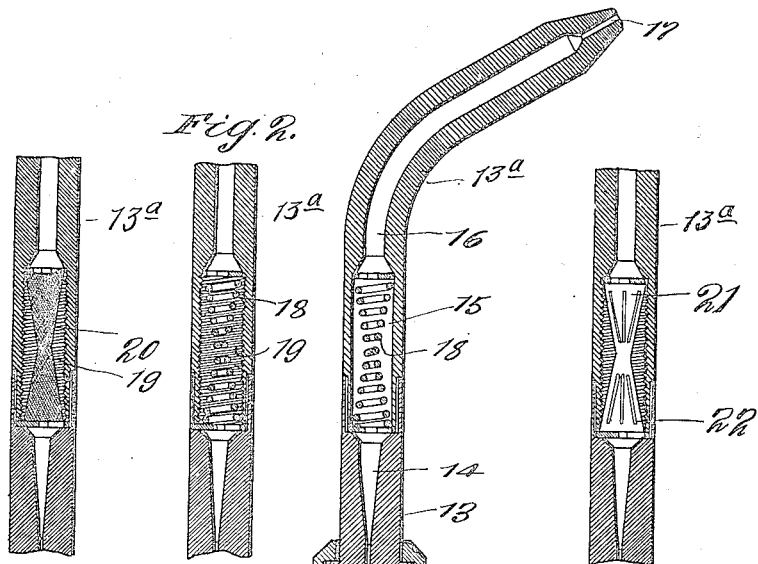
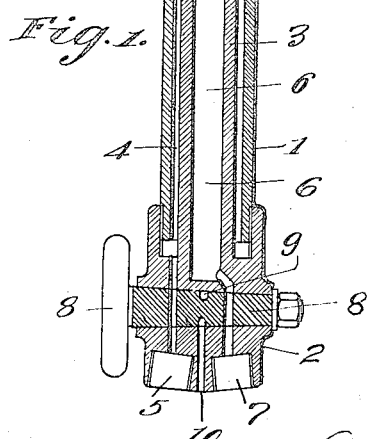
WITNESSES:
Harry C. Hebig
Chas. Lyon Ansell
INVENTOR
Adolf Messer
BY HIS ATTORNEY
Clifford E. Dunn

UNITED STATES PATENT OFFICE.

ADOLF MESSER, OF FRANKFORT-ON-THE-MAIN, GERMANY.

WELDING AND SOLDERING TORCH.

1,214,055.  Specification of Letters Patent.  Patented Jan. 30, 1917.

Application filed June 29, 1911. Serial No. 636,113.

*To all whom it may concern:*

Be it known that I, ADOLF MESSER, a subject of the Emperor of Germany, residing in the city of Frankfort-on-the-Main, Empire of Germany, have invented certain new and useful Improvements in Welding and Soldering Torches, of which the following is a full, clear, and exact specification.

It is well known that in welding and soldering burners, which are actuated with oxygen and some suitable heating gas, the proper mixing of these gases not only involves economy, but conservation of the parts being welded. The noxious influence of the unmixed gases, will in most cases cause a burning of the metals being welded. The small dimensions of the welding and soldering burners, more particularly of the orifices in the burner tube which is situated in front of the oxygen nozzle, render it very difficult to place a really good and efficient mixing contrivance proportionate to the large consumption of gas by the burners.

The mixing chamber forming a part of this present improvement effects in the simplest manner an absolutely certain mixing of the gases to be used, notwithstanding the small dimensions referred to, without placing any considerable obstacles in the way of the flow of the gases and without any material change in the external dimensions of the burner tube. The latter can also be taken out at pleasure whenever it is required for the purpose of cleaning it. To effect an intimate mixture of the entering fluids, I provide an interrupter positioned in the mixing chamber. This interrupter causes a disintegration and breaking up of the streams or eddies of the current and a more intimate commingling of the particles so that thorough mixture is obtained. To further increase the useful effect of the mixing, a screw thread may be suitably cut into the orifice of the mouth piece of the burner, in addition to the mixing contrivance mentioned above, the gyrations of the screw thread effecting a spiral movement of the gas.

In the drawings accompanying and forming a part of this specification, Figure 1 is a longitudinal sectional view of one form of burner, Figs. 2, 3, and 4 are longitudinal sections of the mixing chamber portion and show various devices for effecting the mixture of the gases.

The handle portion of the burner comprises a tube 1. A coupling head 2 is secured to the tube 1. The head 2 is shown having an integral tube 3 disposed within the tube 1. Between the tubes 1 and 3 is a gas space to be supplied with the heating gas through a connection 5. The interior 6 of tube 3 will be supplied with oxygen through connection 7. A single valve 8 is employed for controlling both gases. As these gases are never under the same degree of pressure, it sometimes happens, that, when the valve key becomes loose on its seat and consequently leaky, the gases get into connection with each other prior to arriving in the mixing nozzle. Thus the gases could commingle and return into the gas feeding pipes. Thereby is the operation of the burner not only impaired, but the danger of explosion established. These drawbacks are obviated in the present improvement by the valve 8 being provided with a groove 9 which is in communication with the external air through a channel 10. Hence, when the valve is leaky, the gas being under high pressure is allowed to escape through this channel without any danger and without being able to reach the container for the gas which is under low pressure.

The tube 3 is shown ending in a nozzle 11, which nozzle is surrounded by a conical chamber 12 formed by the rear face of the nozzle 13, embodying the elongated tip portion 13ª formed from a single piece of material. The apex of the conical chamber 12 is shown in alinement with the orifice of the nozzle 11, and from which apex extends a gradually enlarging channel 14. The channel 14 opens into the mixing chamber 15. A channel 16 leads from the mixing chamber 15 to the ultimate orifice 17 at the burner tip. Within the mixing chamber is shown a mixer 18 which in Fig. 1 is in the form of a spiral spring, the convolutions being of gradually decreasing radius from each end toward the center. The gases will be caused to pass through the mixer twice in the passage through the chamber 15.

In Fig. 2 the interior of the chamber is provided with a screw thread 19 for breaking the gas currents and with the mixer effecting a complete mixing of the two gases.

In Fig. 3 the mixer is shown in the form of a wire netting tube 20 constricted at its central portion.

In Fig. 4 the mixer is shown in the form of a sheet metal tube 21 constricted at its central portion and provided with narrow longitudinal slits 22.

With the application of welding and soldering burners excessive heating of the burners through the heat produced at the welding point has hitherto occasioned a considerable difficulty to be contended with. This superheating is obviated in the invention forming the subject of this specification, by the burner tube, instead of being made in the hitherto usual heavy construction with cooling ribs, being constructed in as light a fashion as possible so as to offer as small a surface as possible to the heat radiating from the welding point, and the burner tube is made as long as feasible and from a metal that has a high rate of thermal conductivity, such as copper; this serves the purpose of conducting the heat produced at the tip of this tube toward the oxygen nozzle 11. The cooling of the burner tube is then effected from the interior by the cold gas mixture flowing in.

The object of forming the nozzle long and with a thin wall and of metal having great conductivity is, to facilitate the dissipation of heat generated at the end thereof. It will be apparent that as the metal is thin and of increased surface due to length, no considerable amount of heat will be stored up therein, but that the same will be quickly conducted along the pipe and dissipated into the atmosphere at points throughout its surface.

Having thus described my invention I claim:

1. In a welding and soldering burner, an elongated nozzle embodying a tip portion formed from a single piece of metal of high thermal conductivity and provided with a central passage, one portion of said passage being enlarged to form a mixing chamber, an interrupting element extending the length of the chamber removably mounted therein, and positioning means for engaging the free ends of said element.

2. In a welding and soldering burner, a nozzle embodying an elongated tip portion formed from a single piece of metal of high thermal conductivity, said nozzle having a mixing chamber at one end thereof, a yieldable interrupting element removably mounted therein and extending substantially the length of the chamber, engaging stops formed on the inner wall of said tip portions and arranged to engage the ends of said interrupting element for maintaining the same in operative position within said chamber.

3. A welding and soldering burner embodying a nozzle having an elongated tip portion formed from a single piece of metal of great thermal conductivity, the wall of said tip portion being substantially thin in cross section, a mixing chamber in proximity to one end of said nozzle and a mixing device removably positioned within said chamber.

4. A welding and soldering burner embodying a nozzle having an elongated one-piece tip portion in the form of a pipe and containing a mixing chamber, the wall of said nozzle being substantially thin in cross section and made of copper, and a mixing device positioned in said mixing chamber.

5. A welding and soldering burner embodying a nozzle having an elongated one-piece tip portion and containing a mixing chamber, the wall of said nozzle being substantially thin in cross section and made of a metal of high thermal conductivity and a yieldable mixing device removably positioned in said mixing chamber.

In witness whereof I have hereunto set my hand in the presence of two subscribing witnesses.

ADOLF MESSER.

Witnesses:
JOSEPH BRAELLESBACH,
CHAS. LYON RUSSELL.